Sept. 3, 1929.  F. P. CONNOLLY  1,727,004
COLOR PRESENTATION MEANS
Filed Feb. 25, 1927  3 Sheets-Sheet 1
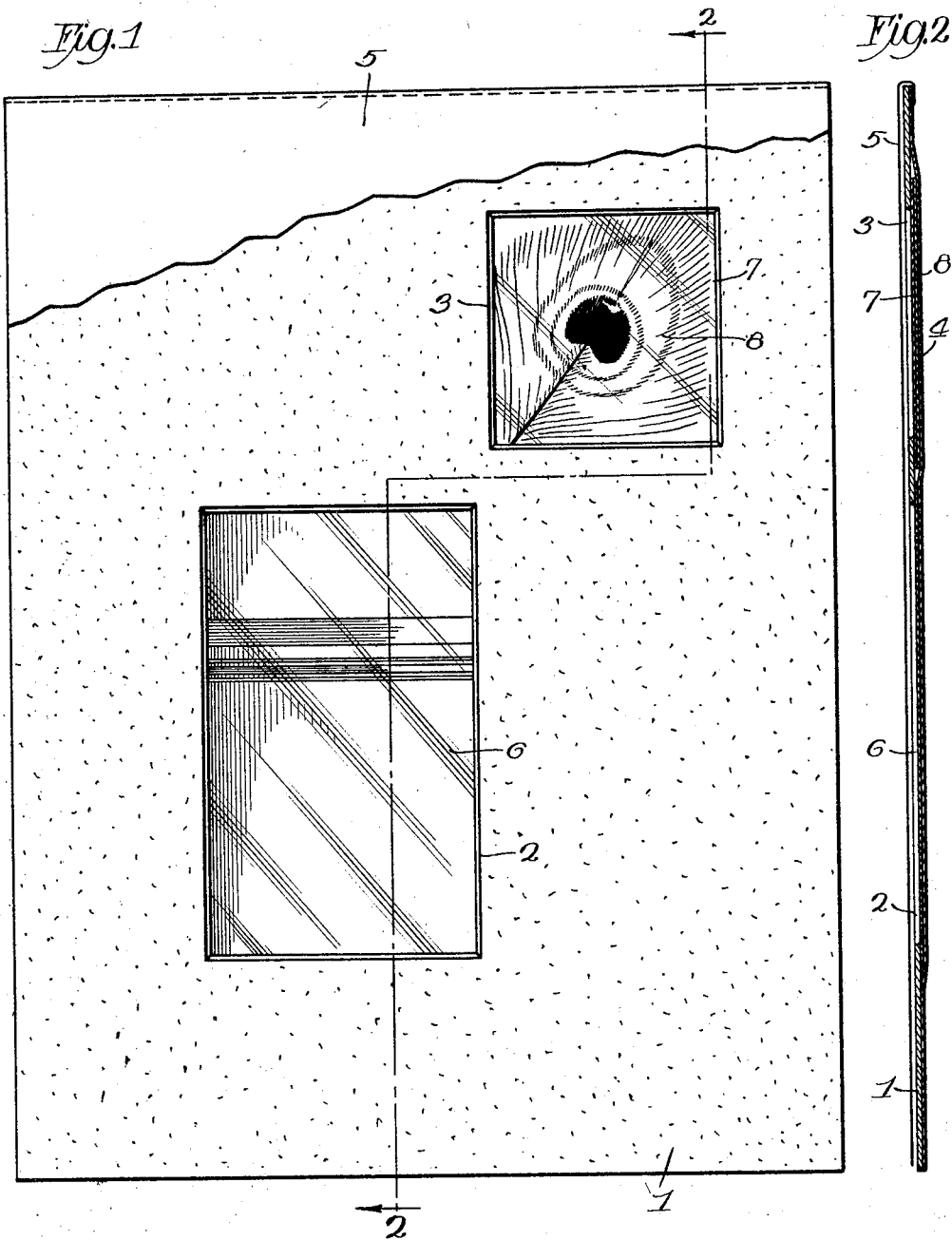
Inventor:
Frank P. Connolly
By Arthur F. Durand
Atty.

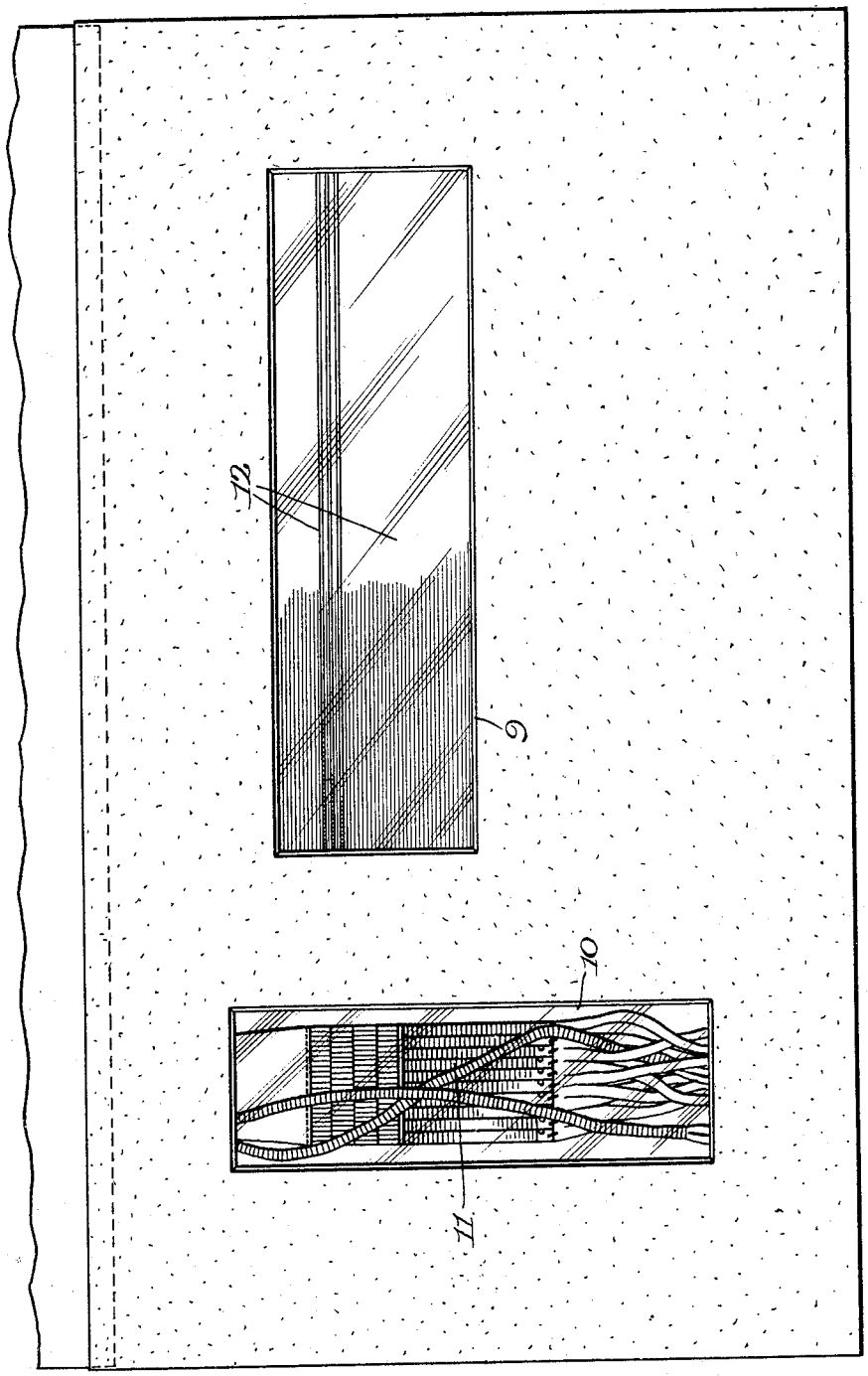

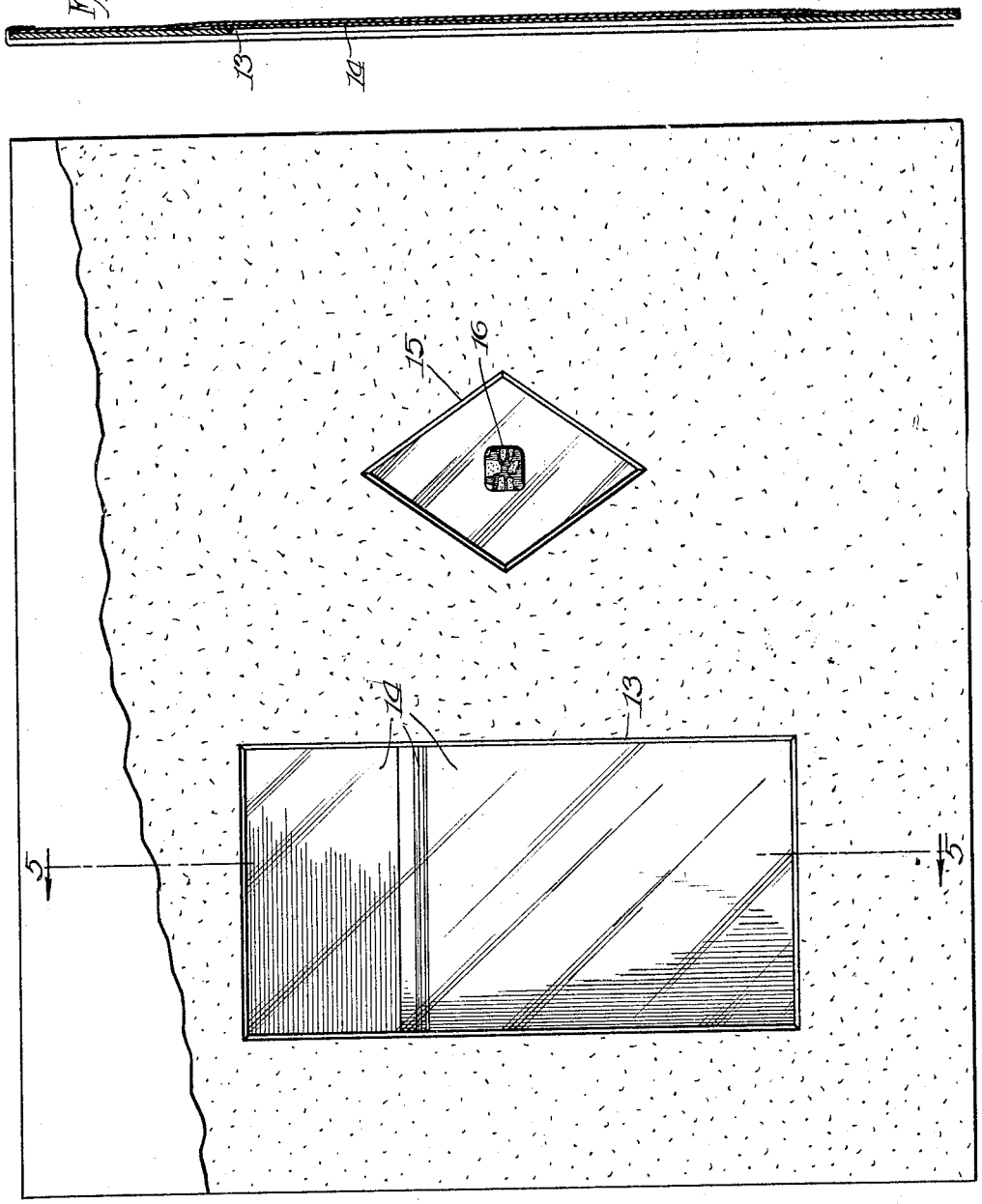

Patented Sept. 3, 1929.

1,727,004

UNITED STATES PATENT OFFICE.

FRANK P. CONNOLLY, OF YORK, PENNSYLVANIA, ASSIGNOR TO VALENTINE & COMPANY, OF NEW YORK, N. Y., A CORPORATION OF NEW YORK.

COLOR-PRESENTATION MEANS.

Application filed February 25, 1927. Serial No. 170,824.

This invention relates to color presentation means, and more particularly to means of this kind for displaying or presenting the colors or shades to be used in painting or varnishing or enameling automobile bodies and for similar purposes.

Generally stated, therefore, the invention contemplates a color presentation means having not only the instrumentalities for displaying or presenting samples of the different colors or shades, for the paints, varnishes or enamels, but having also verification means to show or verify the source or sources of the colors, and to show that the colors or shades are in fact truthful or correct reproductions of the colors or shades found in some article, such as those found in a precious stone, or such as those found in a peacock's feather, or such as those found on an Indian bag, or on anything else in nature or art having a plurality of colors or shades which are susceptible of reproduction for the useful purposes above mentioned.

To these and other useful ends, the invention consists in the matters hereinafter set forth and claimed, and shown in the accompanying drawings, in which,—

Fig. 1 is a front elevation of a color presentation means, involving the principles of the invention.

Fig. 2 is a vertical section on line 2—2 in Fig. 1.

Fig. 3 is a view similar to Fig. 1, showing a different form of the invention.

Fig. 4 is a view similar to Fig. 1, showing a different form of the invention.

Fig. 5 is a vertical section on line 5—5 in Fig. 4.

As thus illustrated, and referring to Figs. 1 and 2, the color presentation means comprises, preferably, a rectangular section of heavy fiber board 1, or board made of paper, having a rectangular opening 2 therein, and having another rectangular opening 3 formed therein, with a paper backing 4 on the rear side, and with a flexible paper protector 5 for the front side of said board, this paper protector 5 being flexibly connected at its upper edge to the upper edge of the board, as shown. Back of the opening 2 is a section 6 of celluloid having the sample colors or shades applied to the rear surface thereof, so that the colors or shades are brilliantly and clearly displayed in an attractive manner. Back of the opening 11 is a section of celluloid 7, or other transparent means, and behind this transparent means is a peacock's feather 8, as shown. In this instance, therefore, the samples of colors or shades displayed within the opening 2 are careful reproductions of two or more shades or colors found in the said peacock's feather. The customer is shown the samples of colors or shades, and is then shown the origin thereof, the samples of shades or colors and the means for verifying the origin thereof being closely associated together, as shown.

In Fig. 3, the sample colors or shades are shown in the opening 9 of the heavy cardboard, or section of picture matting, or any other sheet material that is suitable for the purpose. Within the other rectangular opening 10, having the celluloid or transparent means therein, is a section 11 of an Indian bag, the bag having its different portions differently colored. The sample colors 12, therefore, are reproductions of two or more of the shades or colors of the said Indian bag, and here again the sample colors are closely associated with the means for showing the origin thereof and for verifying their correctness.

In Figs. 4 and 5 the construction and arrangement is similar to that previously described, the rectangular opening 13 being provided as previously for displaying the sample colors or shades 14, and within the diamond shaped opening 15 is the verification means. In this case, and back of the celluloid or other transparent material within the opening 15, is a picture or pictorial reproduction 16 of a precious stone, this stone having shades or colors which are reproduced within the opening 13 in the manner shown. Thus, in this case also, the sample of colors or shades and the means for showing the origin thereof, and for verifying the correctness of the reproduction, are closely associated together in attractive form.

In each case, therefore, the color presentation means comprises a sample of the colors or shades of the paints or enamels or varnishes or lacquers to be sold, and comprises also means associated therewith, in a unitary structure, for showing the origin and verifying the correctness of the sample colors or shades, and the combinations in which such colors or shades are found in nature or art.

It will be understood, of course, that the cardboard or pulp board having the openings forming windows for the color or shade sample means and for the verification means, can be of any suitable or desired shade or color, or texture, and may have printed thereon the names of the sample colors or shades and the name of the article from which the colors or shades were reproduced, and any other explanation necessary or desirable in connection with color or shade presentation means of this kind.

Obviously, with a unitary structure of this kind, comprising practically a flat, rectangular board having the color presentation means thereon, the salesman can show the customer, in a very attractive way, samples of the colors or shades of the paints or varnishes or enamels or lacquers that the manufacturer has for sale, and explain in an interesting and attractive manner the origin of the colors or shades, in some product of nature or art, and show that they are correctly reproduced.

Thus the colors or shades to be sold to the customer are derived from some product of nature or art, and these colors or shades are displayed on the placard or color card in a manner illustrating not only the appearance of each color or shade in actual use, but also the pleasing combination of the different colors or shades. The customer, in other words, can see how the colors or shades will look in actual use, and can then look back to the verification means to see if such colors or shades are substantially correct reproductions of the colors found in nature or art.

Without disclaiming anything, and without prejudice to any novelty disclosed, what I claim as my invention is:

1. Color or shade presentation means comprising, in combination, a plurality of sample colors or shades associated together, and verification means associated therewith to show the origin and verify the correctness of said colors or shades, in one unitary structure, said sample colors or shades comprising a transparent material having the paint or varnish or lacquer or enamel applied to the rear side thereof, said verification means being disposed at the rear side of a section of transparent material, and the structure comprising a board having openings behind which said sections of transparent material are held in place, forming windows for the said color or shade samples and the said verification means.

2. Color or shade presentation means comprising, in combination, a plurality of sample decorative colors or shades associated together, showing how said colors or shades appear in actual practice for decorative purposes, as on automobiles or other objects, and verification means associated therewith to show the origin thereof from a product of nature or art and thereby verify the correctness of said colors or shades, all in one unitary structure, said sample colors or shades comprising a transparent material having the paint or varnish or lacquer or enamel applied to the rear side thereof, said verification means being disposed at the rear side of a section of transparent material, and the structure comprising a board having openings behind which said sections of transparent material are held in place, forming windows for the said color or shade samples and the said verification means.

Specification signed this 17th day of Feb., 1927.

FRANK P. CONNOLLY.